United States Patent [19]

McCarthy

[11] Patent Number: 5,276,312
[45] Date of Patent: Jan. 4, 1994

[54] WAGERING SYSTEM USING SMARTCARDS FOR TRANSFER OF AGENT TERMINAL DATA

[75] Inventor: R. Steven McCarthy, Wickford, R.I.

[73] Assignee: GTECH Corporation, West Greenwich, R.I.

[21] Appl. No.: 624,980

[22] Filed: Dec. 10, 1990

[51] Int. Cl.⁵ .............................................. G06K 5/00
[52] U.S. Cl. .................................... 235/380; 364/412
[58] Field of Search ................ 364/410, 412; 235/380

[56] References Cited

U.S. PATENT DOCUMENTS

| | | | |
|---|---|---|---|
| 4,764,666 | 8/1988 | Bergeron | 235/380 |
| 4,882,473 | 11/1989 | Bergeron et al. | 235/380 |
| 4,897,531 | 1/1990 | Someya et al. | 235/474 |
| 4,982,337 | 1/1991 | Burr et al. | 364/412 |

Primary Examiner—Eugene R. LaRoche
Assistant Examiner—Christopher R. Glembocki
Attorney, Agent, or Firm—Eckert Seamans Cherin & Mellott

[57] ABSTRACT

A wagering system for random drawing lotteries has a central data processor managing acceptance of player entries and payout authorization. Remote agent terminals receive player entry data from players and process authorized payouts. Portable agent data modules having an on-board memory and security provisions are issued to the agents and carry data in both directions between the central data processor and the terminals. Preferably the agent modules are integrated circuit cards or "smartcards". Available player entries are downloaded from the central data processor to the agent data modules, stored on the agent data modules for transport to the agent data terminals, and uploaded under security protection to the agent data terminals when processing a wager. The agent data modules record assignment of the available player entries to players for reporting to the central processor and can obtain payout authorizations or credits. Player entries can be dispensed from the agent data terminals without a need for contemporaneous communication with the central data processor, with protection of security aspects included in the agent data modules. The invention is applicable to verified wager lotteries, instant games and immediate payout number matching games, and is also useful for transferring invoicing and promotional information, etc., using the smartcard as the transfer media.

27 Claims, 3 Drawing Sheets

WAGERING SYSTEM USING SMARTCARDS FOR TRANSFER OF AGENT TERMINAL DATA

BACKGROUND OF THE INVENTION

1. Field of the Invention

This invention relates to methods and apparatus for operating a wagering system or lottery of the type used for sale of wagers or chances to customers. The game can be an instant game, immediate payout number matching game, or one wherein entries sold to customers are recorded at a central processor for later verification in the event of a win requiring a payout. In particular, the invention concerns such a wagering system wherein the chances and payouts are dispensed to customers from remote agent terminals which need not be in contemporaneous data communication with the central processor, secure transfer of information being made possible using a portable agent data module, preferably in the form of an integrated circuit card or "smartcard." The invention facilitates issue of available wagers to the agent terminals for potential sale, reporting of player entries back to the central processor, transmission of payout authorizations back to the agent terminals, payout security control, control of prize liability, dissemination of lottery information to retailers, transmission of invoicing information to retailers, and other functions.

2. Prior Art

U.S. Pat. No. 4,764,666 - Bergeron and U.S. Pat. No. 4,882,473 - Bergeron et al disclose the application of a data storage card, preferably an integrated circuit card or smartcard, to storage of player information in a lottery system. The smartcards are issued to players, for storage of value tokens as well as demographic information which is useful to the lottery operator for marketing purposes. The smartcard identifies a player and enables the player to purchase a balance to be applied against purchase of player entries, and to be credited upon wins. The card is a substantial convenience to players and to lottery operators because it is not necessary to enter manually a great deal of data in order to manage a play entry or a payout. The card, however, is not an operating element of the lottery system itself, and does not assist in communications needed between a central data processor (which issues play verifications) and the agent terminals (which accept wagers and authorize payouts). Furthermore, the amount of data storage required according to this technique is not large.

A smartcard in general is substantially the size of a credit card, yet has on-board a memory and a processor for accessing the memory and for managing communications. Coupling to the card for data transmission, and also for powering the card, is accomplished via conductor pads presented on the card surface or by inductive coupling to coils in the card. When the card is inserted in a terminal operable to interface with the card, the necessary data transmission and power supply connections are made by appropriate contact and/or interface elements in the terminal. Smartcards are most typically used as customer account cards for banking services or as pay-for-usage cards which store a balance to be debited when the card is used. For loading information (e.g., value credits or other data) and for unloading information (e.g., debiting the balance or reading the card contents), the processor on the smart card typically requires entry of a unique authorization code by the operator. If the correct code is not entered, the card is unusable, and may be arranged to disable itself in the event of an attempted unauthorized access or function. Smartcards according to this description are available from Thomson Components - Mostek Corporation, 1310 Electronics Drive, Carrollton, Tex. 75006.

A typical lottery system involves players correctly guessing which of various possible numbers will be randomly chosen as the winning combination. Terminals at remote locations operated by the lottery's agents engage in bidirectional data communication with a central data processor for each play entered. Each play must be properly entered in the pool of player entries, to have its respective chance at winning and to guard against the possibility of a fraudulent claim of a win. The terminal at which each play was entered is indexed to the play to enable the agent at that location to advise his customers to claim their winnings and also to guard against fraud. More than a hundred million player entries have been made in recent state sponsored lottery events. The player entry numbers for every play must be scrupulously recorded and verified for later confirmation in the event of a win, and in order to run a fair lottery.

The particular communications which might be required to effect a play entry and verification include a report from the agent terminal of a play entry and the numbers selected by the user. The central processor may answer back with a verification code and/or preferably repeats the play entry numbers back to the agent terminal to check the accuracy of reception. The numbers must be the same as printed by the agent terminal and as recorded at the central processor, because the player will rely on the printed lottery entry form. The particulars of each play entry must be communicated to a secure location where the entries can be recorded for later comparison with entries presented by players to claim winning prizes. Typically, these communications are handled over pulse code modulated radio or telephone lines, and accordingly, the transmission includes a code representing the identity of the agent terminal. The central processor normally assigns a serial number to an entry and records the particulars of the entry.

Traditionally, the "communications" undertaken in wagering systems amounted to carrying written records of play entries from a point of sale to a secure central location. Such written records are openly readable and are prone to loss or alteration. Accordingly, high speed contemporaneous bidirectional data communications have substantially replaced written records. Typically, an agent terminal at the point of sale is operated by a lottery agent to transmit player entry data to a central location and to accept a player entry verification from the central location indicating that the wager has been accepted and recorded, before the transaction is finalized by printing of a written record. This allows immediate sale of lottery entries and prevents problems with loss, delay or alteration of records needed to confirm (at a later time) the sale of a winning entry. When a player claims a winning prize, the data at the central location can be compared to the data presented by the player on the alleged winning entry form.

Where an agent terminal is in constant or intermittent data communication with the central processor (i.e., when communicating with the central processor regarding entry of a wager), the terminal is said to be "on-line". The maintenance of a data communication link between a central data processor and a plurality of remote agent terminals presents a certain overhead in that the hardware necessary to support data communication must be dependably operative, and security functions are needed to prevent a spurious player entry or payout instruction.

It is possible to operate agent terminals off-line, in a manner similar to the operation of a lottery based on written records. However, the immediate verification of player entries is not then available, and the record produced is merely a digital record which has substantially the same content, and the same drawbacks, as a handwritten record. The record (for example a magnetic tape) can be read and altered relatively easily.

The Pronostico lottery system in Mexico City, for example, formerly operated a lottery system accepting player entries at remote terminals, with off-line reporting of the accepted wagers to a central location, namely by transporting a magnetic tape record of the entries to the central location. This type of operation, which does not rely on contemporaneous communications with wager transactions, accommodates sales agents that for one reason or another are not equipped with data communication equipment for obtaining immediate on-line entry and verification of player entries. Off-line agent terminals are provided with data systems that store wagers on the magnetic tape. The player receives a portion of the lottery entry slip as a receipt after a serial number is assigned by the terminal and printed on the slip, and the remainder is saved for reference. The serial number is recorded on the magnetic tape with the wager. Magnetic tape cassettes with recorded plays are collected at the lottery headquarters some days prior to a lottery draw, whereupon the data is transferred onto the mainframe central data processor.

An off-line system as described places a certain reliance on the ability of the lottery system to protect the magnetic tape record. In addition, the agent terminal needed to record transaction data is nearly as complex and expensive as a terminal adapted for telephone or radio communication with the central location. Besides the processor normally required on the agent terminals to handle printing of lottery entry slips, it is necessary to provide hardware for accomplishing the magnetic tape recording. If the system is required to handle more than a single type of lottery game, a relatively sophisticated recording system is needed. A relatively large number of transactions can be recorded on magnetic tape, but to enable sufficient time to ensure transport of the magnetic tape cassette to the central location and entry of the data prior to the lottery prize drawing, two days of lead time are needed to collect and enter the data. The system does not handle short term drawings, e.g., daily three number drawings. Therefore, not only is an investment in hardware needed, but in addition, the delay in reporting is such that two days of potential sales in, e.g., every weekly drawing, are lost. These drawbacks are accompanied by a relatively lower level of security than obtained with an on-line wagering system.

Pronostico recently replaced its off-line lottery system with an on-line system wherein wagers are contemporaneously verified and logged at the central lottery location. However, when a converting an off-line system to an on-line system it may occur that not all of the off-line agents can be coupled into data communication with the on-line network. For example certain agents may be located in remote areas and it is often not practical, or cost effective, to provide the necessary hardware, perhaps including satellite communications, microwave relay stations, etc., which would enable contemporaneous communications with all potential agents or points of sale.

Lottery game rules vary substantially. In some forms of wagering systems, the lottery operator is exposed to potentially disastrous losses in particular instances. Accordingly, rules have developed allowing the lottery operator to limit the number of wagers accepted in these instances. For example, certain games are arranged to pay out preset prize amounts if a player-chosen number equals a randomly chosen number. To avoid potential extensive liability in such games, it is known to limit the number of chances available to be sold on popular numbers (e.g., "777") to avoid an unacceptable payout if the popular number is drawn. It is not possible to coordinate the sales made at a plurality of agent terminals by simply recording the transactions and reporting them to the central location prior to a drawing. This problem is aggravated by undue delay in reporting accepted wagers to the lottery central location.

There is a need to enable an off-line lottery agent to operate in substantially the same manner as an on-line agent, while reserving the necessary security and data capacity needed to handle wager acceptance recording, prompt verification and preferably payout management. The system should enable quick and secure reporting, but require a minimum of hardware as compared to an on-line lottery terminal system. According to the present invention, a data module is provided for bidirectional communication with both the central processor and the agent terminal. Bidirectional communication enables the link between the agent terminal and the agent data module to be quite secure, and the data module, preferably an integrated circuit card or smartcard, can independently protect security by automatically disabling itself when a breach of security or attempted breach of security is detected. The data uploaded or downloaded to the smartcard can be read and transmitted at the central processor location or at a limited number of agent access terminals or hub terminals which interface between the agent cards and the central processor. The agent access terminals or hubs can be provided at distributed locations, each available to a plurality of lottery agents, thereby obviating the need for contemporaneous communications while reducing the delay in reporting wagers to the central location. The agents can readily upload a record of wagers accepted and can obtain new wager sale authorization information and payout information on a daily basis. The agent data module is interactive and secure, preferably a smartcard or the like, and can be programmed to communicate to the agent terminals any limitations which may apply to acceptance of wagers The agent data module or smartcard can be stored with preset verifications as to potential wagers which are available and stored on the smartcard for sale. In this manner, the convenience and security of an on-line system can be combined with the low investment aspects of an off-line system, thereby improving the availability and security of lottery services to customers.

SUMMARY OF THE INVENTION

It is an object of the invention to provide an at least partly off-line lottery system that employs a secure portable interactive data storage means as a link between a lottery central data processor and agent terminals operative to receive and verify wagers.

It is another object of the invention to apply the benefits of integrated circuit cards or smartcards to control processing of data passed between lottery agent terminals and lottery operators, preferably using insofar as possible the same hardware that is otherwise available for communications between lottery players and lottery agents.

It is a further object of the invention to increase the availability of lottery services to players by providing a supplemental data communication means by which the functions of a lottery central processor can be transported to remote locations on a secure interactive data carrier, without the need for contemporaneous communications, and at minimum delay in processing.

These and other aspects of the invention are embodied in a wagering system, for example of the type used for random drawing lotteries, having a central data processor to manage acceptance and verification of player entries, and payout authorization. Remote agent terminals receive player entry data from players and process authorized payouts. Portable agent data modules having an on-board memory including magnetic media, integrated circuit memory and/or laser optical memory, are issued to the agents for carrying data in both directions between the central data processor and the terminals. The agent terminals include self contained security aspects operative to block operation in the event of a breach or attempted breach of security. Preferably the agent modules are integrated circuit cards or "smartcards". Available pre-authorized player entries are downloaded from the central data processor to the agent data modules, stored on the agent data modules for transport to the agent data terminals, and uploaded under security protection to the agent data terminals when a wager is processed. The agent data modules record assignment of the available player entries to players for reporting to the central processor and can also obtain prize payout authorizations. In this way player entries can be dispensed from the agent data terminals without a need for contemporaneous communication with the central data processor, with protection of security aspects included in the agent data modules. In order to minimize the timing of reporting accepted wagers to the central data processor, the system preferably includes a plurality of distributed hub terminals which are capable of on-line communication with the central processor, and which are accessed by the agents on a frequent, e.g., daily basis. These hub terminals can be on-line agent terminals coupled into the system, which are adapted to upload and download data as well as to handle regular agent terminal functions. Alternatively, the hub terminals can be special purpose points of access for communication with the central processor.

BRIEF DESCRIPTION OF THE DRAWINGS

There are shown in the drawings exemplary embodiments of the invention as presently preferred. It should be understood that the invention is not limited to the precise arrangements and instrumentalities shown in the drawings, wherein.

DETAILED DESCRIPTION OF THE PREFERRED EMBODIMENTS

Figure 1:
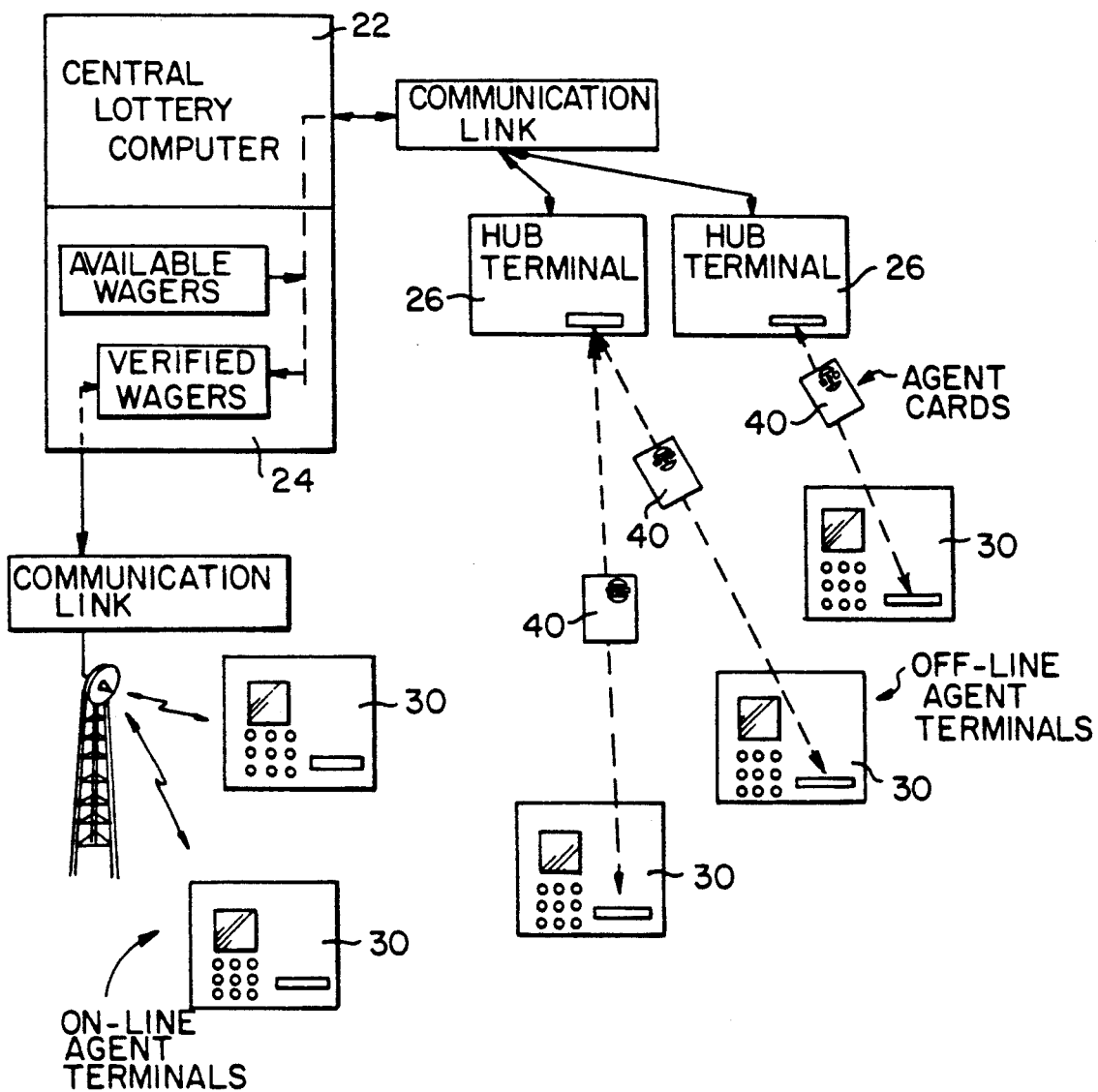
FIG. 1 is a block diagram of a lottery system including off-line agent terminals in accordance with the invention.
Figure 2:
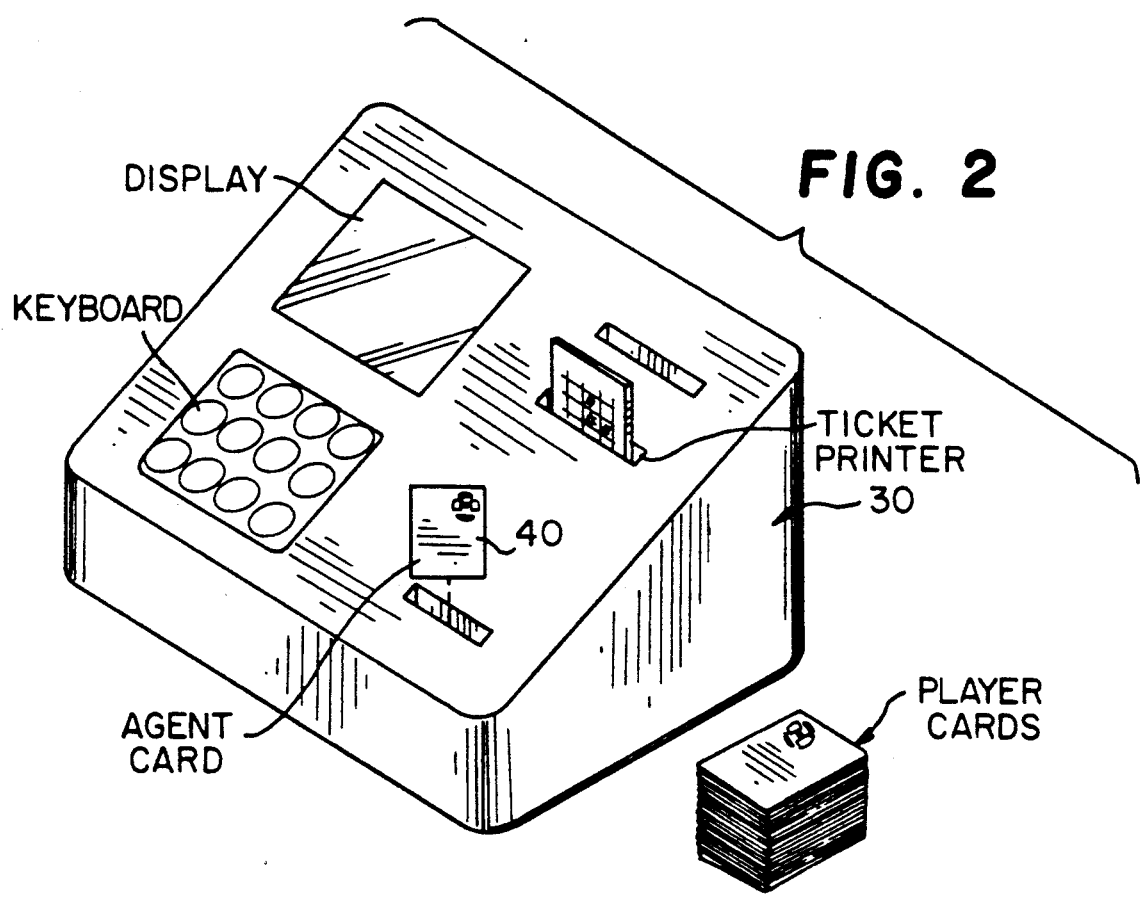
FIG. 2 is a perspective view of a lottery agent terminal, the player and agent smartcards being shown in exploded view.

As shown in FIG. 1, a wagering system according to the invention includes a central data processor 22 having a central data memory 24. The central data processor 22 is operable to manage acceptance of player entries, verification of player entries, and/or payout authorization for player entries. The central processor handles all the usual functions of a lottery central computer, namely acceptance of wagers and storage of data thereon for later verification in the event of a claimed win. However, the data flowing into and out of the central processor is wholly or partly carried on secure media separate from the usual communication links used by lottery systems to communicate with the agent terminals at which the wagers are sold to players. The system includes a plurality of agent terminals 30 which are operable to receive player entry data from players. The agent terminals may or may not require the actual participation of an agent in the sale (i.e., the terminals can be automated vending apparatus which an agent visits occasionally to upload and download information). Instead of coupling the agent terminals to the central processor as a sole means of data communication, a plurality of agent data modules 40 are issued to the agents, for storing data to be passed in either direction between the agent terminals and the central processor 22.

The system of the invention can comprise all off-line agent terminals as described, or a subset of the agent terminals can be operable on-line in the system while others are operable off-line, as shown in FIG. 1 Additionally, the terminals can be arranged to operate in either an off-line mode or an on-line mode. The affected agents can then revert to off-line operation in the event of a disruption in communications between the agent terminals and the central location. In the event that some of the terminals operate off-line and others operate on-line, the on-line terminals can be used as a means for the off-line users to access the central data processor. Preferably, however, at least some hub terminals are distributed in the areas where off-line agents reside, to facilitate communications on-line with the central processor for servicing the agent data modules.

The agent modules 40 are self contained, secure and transportable, and are connectable for off-line communication with at least one of the agent terminals 30 in the system. The agent modules can be programmed to communicate with only one or several of the agent data terminals, by storage of identity codes in the agent modules and in the terminals for comparison. Alternatively, the agent modules can be usable with any of the agent terminals.

The agent terminals can include a control keyboard, marked-form reader, entry form printer and display, in the conventional manner. The agent terminals also have an interface for accessing the agent data modules 40. The interface can include appropriate connectors or current induction means arranged to engage between the agent modules and the agent terminals, for exchange of data and preferably also such that the agent modules can be supplied with electrical power from the agent terminals.

The agent terminals download from the agent data modules prospective available wagers, which have been stored on the modules either when the module was issued, or preferably as downloaded onto the module during on-line communications with the central data processor. The agent terminal uploads to the agent modules a report of wagers sold. The agent terminals can be of the type mentioned in U.S. Pat. No. 4,764,666 - Bergeron and U.S. Pat. No. 4,882,473 - Bergeron et al, which are hereby incorporated. In the Bergeron system the agent terminals are arranged to read integrated circuit smartcard modules issued to the players for storing players' preferred entry data and the like, as well as other information such as demographic information about the player. According to the present invention smartcard modules are issued to the agents instead of the players, for communication regarding authorization and acceptance of wagers rather than handling specific wagers for specific players. If desired, both players and agents can use smartcard modules, preferably for use with agent terminals having two smartcard interfaces whereby wagers are selected from the player module, and downloaded from the agent module when the wager is processed.

The agent data modules 40 have an on-board memory 42 for storage of data when being carried to or from the agent terminals. The on-board memory of modules 40 includes at least one of: magnetic media, integrated circuit memory and laser optical memory, the agent terminals including the appropriate read/write circuitry needed to access the data on the agent data modules. Interspersed between the memory on the module and the connectors and the like for accessing the memory is a security means operable to sense for attempted unauthorized access and to disable the agent module in the event unauthorized access is attempted. The security means, for example, can block all further operation of the data module in the event access is attempted without a correct security code. The security means can also simply decline to pass data for a certain time period or can require entry of an unlocking code in order to restore operation following an access without the required code, format or the like.

The agent data modules 40 are connectable in data communication with the central data processor 22, either directly at the central processor, or preferably at an intermediate node or hub 26. The intermediate node or hub 26 is coupled or coupleable in on-line data communication with the central processor. The system may include a number of hubs 26, for example distributed throughout particular neighborhoods, connected to the central processor through a communication link such as a radio link, telephone system or the like. In this manner, only the hubs 26 require the data communication equipment needed for bidirectional data transmission with the central location, but all the lottery agents accessing the hub are operatively connected to the lottery system for handling the issue of available lottery entries for sale, reporting of player entries sold, transmitting payout authorizations, controlling prize liability, broadcasting lottery information to agents, transmitting invoicing information to specific agents, and similar functions which would otherwise require contemporaneous communications between the agent terminals and the central processor.

Figure 3:
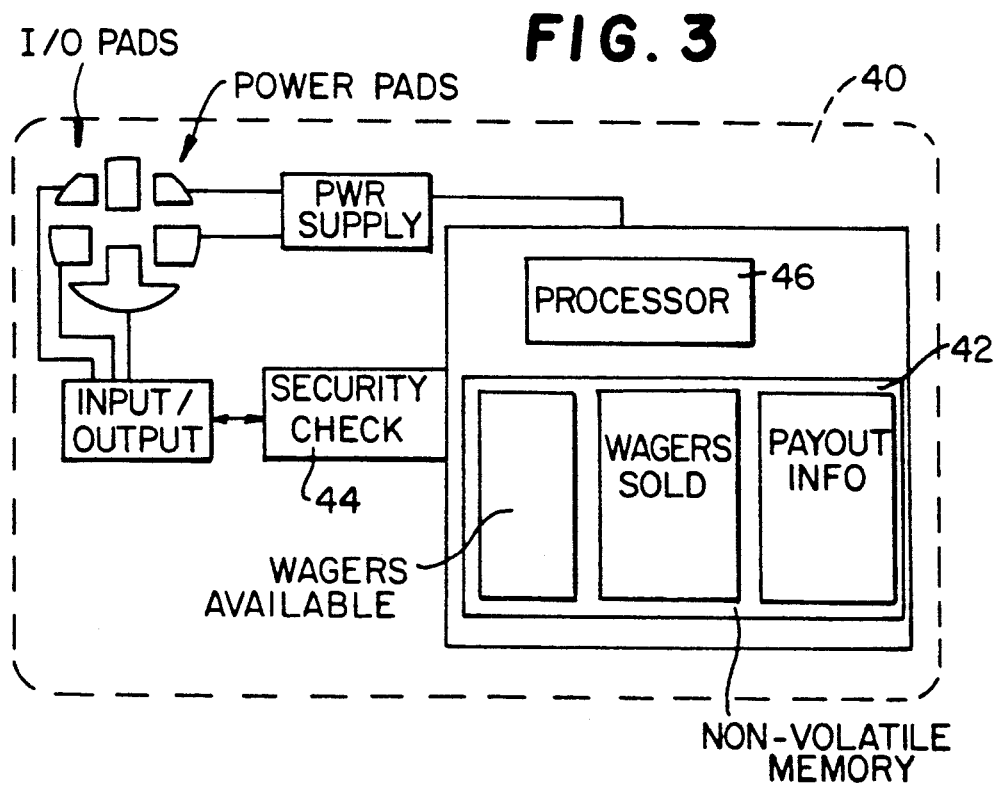
FIG. 3 is a schematic block diagram illustrating the contents of an agent data module or smartcard; and, FIG. 4 is a schematic illustration of data flow and functional operation according to the invention.

The agent data modules 40 are shown in block diagram form in FIG. 3. The modules 40 can be integrated circuit cards or smartcards, and include on-board security means 44 preventing unauthorized alteration of data on the card. The security means 44 is operable for at least one of blocking unauthorized access and preferably can automatically disable the smartcard, denying access to previously loaded wager authorizations. Preferably, the card does not erase information on already accepted wagers, but merely denies information or access to the information unless specially processed, e.g., with an unlocking code as noted above.

The agent data modules 40 are operable to download from the central data processor 22, and to store, indicia representing a series of available player entries and/or verifications of the available player entries, for assignment to players. This pre-loaded information represents previously authorized transactions which may thereafter be made at the lottery agent terminal. The agent data modules 40 are coupleable in data communication with the agent data terminals 30 and operable in conjunction with the agent data terminals 30 to record assignment of the available player entries to said players, whereby player entries can be dispensed from the agent data terminals without a need for contemporaneous communication with the central data processor. Preferably, both the agent data modules and the agent data terminals include computer processors and memories for storage of program data and transaction data, to be handled in the manner described, under control of the processors and in accordance with programming stored in ROM or programming downloaded to the module, and possibly to the terminal from the module. For example, in addition to handling data communications regarding wagers, the smartcard can be used to carry program revisions and similar operating instructions to the agent terminal.

The agent data modules 40 are operable in conjunction with the central data processor 22 to upload a record of assignments of the available player entries to the players. In this manner the player entries are recorded for later review in the same manner as player entries which are entered and verified immediately in a lottery system wherein the agent terminals are in direct on-line communication with the agent terminals. The uploaded player entries from the available player entries as assigned to players, become entries in a pool of player entries from which at least one winner is to be selected. When a winner is selected, the verified entries are available in the same manner as entries entered and verified immediately rather than after reporting through the agent data module or smartcard. Inasmuch as the entries are pre-authorized and are communicated in both directions using a smartcard having on-board security means, the data is as secure as on-line communications conducted using data communications through secure data communication links, for example including encryption of the data transmitted. If desired for additional security, the smartcards can be programmed to communicate in encrypted data with the central processor and/or with the agent terminals.

When a winning data entry is entered through an agent data module 40, the central data processor 22 can be operable to download to the particular agent data module 40 indicia representing a winning player entry previously uploaded from that particular agent data module, whereby a player can claim a prize at the same location where a wager was placed. To accomplish this, the central processor can be arranged to index in memory the identity or code that identifies the particular data modules to which specific pre-authorized wagers were downloaded, or can simply index an agent identity code when uploading wagers actually sold. A code for uniquely identifying the data module is also useful for monitoring the usage of the agent data modules and for preventing unauthorized use by forming part of the security check accomplished by the security means 44 in the event of an attempted access to write or read data stored on the smartcard. Preferably the security means 44 of the agent data modules includes at least one of encryption and decryption means, security access code detection means, unauthorized access detection means, and automatic blocking of the available player entries, to further prevent unauthorized use. The module protects itself from misuse, the security means 44 being operable at least during data communication with one of the agent data terminals 30, and preferably during any data communication with the agent data modules 40.

The agent smartcard module can be arranged to verify winning lottery entries which normally are not verified via contemporaneous communication with a central lottery computer, such as so-called instant games. These games typically involve preprinted indicia enabling an immediate payout in the event of a win. For example, an instant ticket can be arranged such that an entry ticket with concealed indicia is issued to the player, who scratches away a coating, tears away a cover or otherwise reveals some notation that for certain of the issued tickets indicates a winning prize. Unscrupulous players sometimes attempt to doctor instant tickets which are not winners, for example by attaching or copying missing notations or parts of notations that distinguish a winning ticket from other tickets. Unscrupulous players also sometimes duplicate a winning ticket and present copies to more than one agent. Of course it is not desirable to make known to the agent which of the tickets in stock is a winning ticket. In the industry, attempts have been made to encode tickets via a unique or semi-unique code (known as a VIRN number), which is often also concealed and can be checked for correspondence with an expected VIRN number. However, such a comparison may be ineffective against duplicates and may require communication with the lottery authorities that issued the tickets. According to the invention, winning VIRN numbers and ticket serial numbers can be stored on the agent smartcard under total security protection due to the internal security means on the agent smartcard. The agent is not made aware of winning entries in stock; however, without the need for communications with the lottery central processor the tickets issued to a particular agent and later presented for collection of a prize can be authenticated. The internal processor on the agent smartcard can be programmed to decline to reveal in any communication the contents of those memory locations where winning VIRN and serial numbers are stored, except to indicate a win when an actual winning instant ticket is processed. In this manner payouts for the instant game are made substantially more secure.

Due to improved security, instant ticket validation can be handled apart from a complete on-line agent terminal wherein lottery entries in general are processed. The agent "terminal" can be as simple as a handheld device that becomes charged with information as to predetermined wins when a loaded agent card is placed therein, and can function merely as a means for authenticating winning entries issued presented by players to claim a prize. The agent enters identifying data (VIRN and serial numbers) to be compared to a list including the corresponding numbers of winning tickets issued to the agent for distribution. The agent "terminal" needed for this function is small and inexpensive, and can be more widely distributed in a cost effective manner than full function lottery agent terminals, enabling small scale business operations to offer lottery entries among their products at minimal investment by the lottery or by the agent.

Whereas pre-authorized player entries are downloaded from the central lottery computer to the agent smartcard, the lottery operators have full control of liability. The frequency of all possible number combinations can be tabulated and used to compute the potential liability of the lottery to each of the combinations. The agent smartcards are then loaded with the appropriate number of occurrences or are programmed to cease sales of a certain number entry when the maximum number for that entry is reached. Therefore, even without contemporaneous communications with the central computer, the lottery can safely operate a fixed-payout numbers game or the like, with full security and with popular numbers available to players.

The agent smartcards are useful for additional functions besides transferring wagering data to and from the central lottery computer. For example, the agent smartcard is preferably arranged to transport invoice information to the lottery agents. The data on wagers sold, as reported to the central location on an agent's smartcard, can be used to generate an invoice from the lottery system to the agent, the invoice amount being based on the amounts collected by the agent for wagers, perhaps adjusted for amounts which have been dispensed or are to be dispensed by the agent to pay out wins. This function is also handled with full security due to the onboard security means provided by the agent smartcard, including the capability of limiting or precluding access to reading and/or writing of certain information carried on the agent smartcard.

Information not subject to an interest in security can also be transferred using the smartcard. Announcements of upcoming events, rules changes, promotions, new wager offers and the like can be readily communicated to the agents using the smartcard as the media by which the information is carried. The lottery can communicate the message to all agents, or only to agents in certain categories (e.g., geographical areas, customer volume brackets, etc.) if desired, because the agent smartcards can be specific to a particular agent by virtue of an agent identity code, agent terminal identity code or the like. Furthermore, the agent smartcard itself reports to the lottery system on the number and type of wagers sold, which data is subject to analysis. Where the agent smartcards are used in conjunction with player smartcards as in the Bergeron patents, supra (i.e., by using terminals with interfaces for both types of cards), the agent smartcard can report on information provided by the smartcards of customers, such as demographic information, frequency of play, and so on. Therefore, the agent smartcards provide the lottery with a means to improve service and sales by identifying problems to be corrected or successes to be rewarded, information on which is made available by transfer of data using the agents' smartcards. To a large extent, data transfer can be conducted with minimal or no effort on the part of the lottery agent. The smartcard thus gives the lottery operators control over information dissemination at a plurality of levels, as well as records of the dissemination of information to particular agents.

According to the preferred embodiment the agent data modules 40 are integrated circuit cards or smartcards with on-board processor 46 operable to manage data communication with the agent data modules 40 and storage of data thereon. The cards are powered substantially via external power supply means during communication with at least one of the central data processor 22 and the agent data terminals 30. The cards include at least one of a non-volatile programmable data memory, and a volatile data memory with battery means for maintaining contents of the volatile data memory. Power is supplied from the terminals or processor to the card by means of contacts with the card, as shown in FIG. 3, or by induction of current into the card when loaded into a terminal or the like for reading, the induced current being rectified and regulated by a power supply built into the card.

The cards need not be coupled directly to the central processor 22 in order to accomplish data communication. Communication is preferably conducted through one or more intermediate terminals which are coupled to the central processor and which include interface elements for the card. At least one transfer data terminal 26 is in data communication with the central data processor, the transfer data terminal being operable to interface between the agent data modules and the central data processor during communications between the central data processor and the agent data modules.

Figure 4:
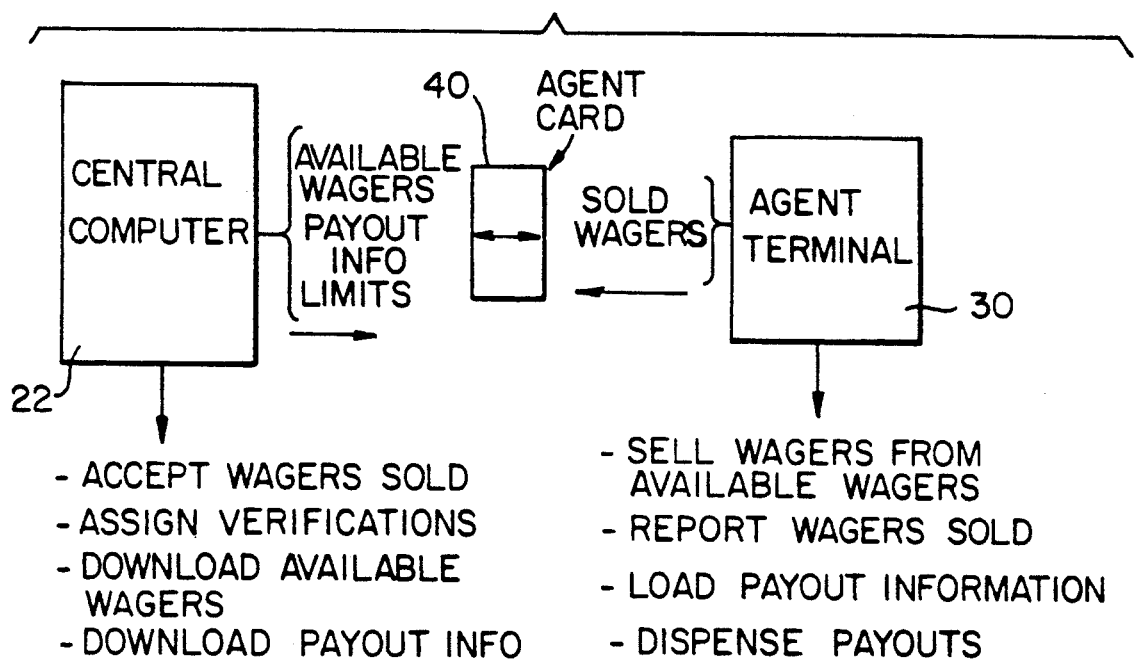

The invention may be considered a method as well as an apparatus. The functions of the central computer, the agent card and the agent terminals are illustrated in FIG. 4. The method enables the lottery operators to conduct a wagering system in which player wagers are accepted at points of sale remote from a central data processor 22 and managed by the central data processor, in the same manner as a conventional lottery system is operated. Additionally, however, the system does not require contemporaneous communication between the agent terminal 30 and the central system because off-line communication is accomplished through the agent data modules or smartcards 40. The method includes providing a central data processor 22 having a central data memory 24, and managing at least one of acceptance of player entries, verification of player entries, and payout authorization for player entries, using the central data processor 22. Player entry data is accepted from players at agent terminals 30 remote from the central processor 22. Agent data modules 40 are issued to agents, the agent modules being self contained and transportable. The agent modules 40 are at least periodically coupled in data communication with at least one of the agent terminals, the agent data modules having an on-board memory including magnetic media, integrated circuit memory and/or laser optical memory, for example. The agent data modules also are coupled at least periodically in data communication with the central data processor, either directly or through an intermediate hub terminal 26 in communication with the central processor 22. By coupling the agent data modules 40 to the central data processor 22 and downloading indicia to the agent data modules 40 from the central data processor, and storing the indicia on the agent data modules, prospective wagers are loaded onto the agent data modules to be dispensed at the agent terminals 30. The indicia represents a series of available player entries and verifications of the available player entries, for assignment to players. The agent data modules are decoupled from the central processor, transported, and coupled to the agent data terminals. The modules 40 can remain in the agent terminals 30 as wagers are dispensed, or can be loaded into the agent terminals occasionally for access. The agent operates the agent data module in conjunction with the agent data terminals to record assignment of the available player entries to the players. During data communication with the agent data modules, unauthorized access is sensed. The operation of the agent data module can be blocked temporarily or permanently upon detection of unauthorized access, using security means self contained and independently operable in the data modules.

The method further includes uploading to the central data processor a record of assignments of the available player entries to the players, by loading the record of assignments to the agent data modules, decoupling the agent data modules from the agent data terminals, coupling the agent data modules to the central data processor, and transferring the record of assignments to the central data processor. The agent data module 40 is thereby effective to function as a secure path of bidirectional communication for accepting and managing lottery entries.

Via the central data processor 22, the operator processes uploaded player entries from the available player entries as assigned to players. The player entries can become entries in a pool of player entries from which at least one winner is selected. For handling payout to the winner, indicia can be downloaded to the agent data module which originally recorded a winning play entry, enabling the agent to dispense the prize to the appropriate player. The indicia can include a credit to the agent's account in the event the prize is money to be paid to the player.

Preferably, security steps are associated with data communication with the agent data modules, to prevent tampering with the data therein. The security steps including at least one of encrypting and decrypting data, detecting a security access code, detecting an unauthorized access, and automatically blocking the available player entries, operation of the agent data modules being stopped independently by the agent data modules upon detection of a breach of security. This can involve, for example, a security access code associated with an identifying code unique to each module and stored in the central processor and known to the agent or encoded in the agent terminal Should any data communication be attempted with the agent data module in the absence of the correct access code, the module can automatically lock up, under control of its onboard processor, erase any information thereon, or otherwise render the module useless to an unauthorized person.

The invention having been disclosed, additional variations and embodiments employing the novel aspects of the invention will now become apparent to persons skilled in the art. Reference should be made to the appended claims rather than the foregoing specification in order to assess the scope of the invention in which exclusive rights are claimed.

I claim:

1. A wagering system for accepting wagers and managing payout on winning wagers, comprising:
   a central data processor having a central data memory;

a plurality of agent terminals openable to receive player entry data from players, the agent terminals and the central data processor being operable in conjunction by communications including data transmitted from the central data processor to respective said agent terminals defining available wagers for sale, data transmitted from the agent terminals to the central data processor reporting wagers sold, and data transmitted from the central data processor to the agent terminals authorizing payout for winning player entries;

a plurality of agent data modules for issue to agents, the agent modules being self contained and transportable, and being connectable in data communication with at least one of the agent terminals, the agent data modules having an on-board memory including at least one of: magnetic media, integrated circuit memory and laser optical memory, said agent data modules also being connectable in data communication with the central data processor, the agent data modules including on-board security means operable for at least one of blocking unauthorized access and automatic self cancellation; and, wherein the agent data modules are operable to download from the central data processor, and to store, data representing a series of available player entries and verifications of the available player entries, for sale to players, the agent data modules being coupleable in data communication with the agent data terminals and operable in conjunction with the agent data terminals to record assignment of said available player entries to said players, whereby player entries can be dispensed from the agent data terminals and payouts verified, without contemporaneous communication with the central data processor.

2. The wagering system according to claim 1, wherein the agent data modules are operable for bidirectional communication between the agent terminals and the central data processor, for both downloading from the central data processor data defining available wagers for sale and uploading to the central data processor a record of wagers sold.

3. The wagering system according to claim 2, wherein the central data processor is operable to process uploaded wager data from the available player entries as assigned to players, as entries in a pool of wagers from which at least one winner is to be selected.

4. The wagering system according to claim 3, wherein the central data processor is operable to download to particular said agent data modules data representing a winning wager previously uploaded from said particular agent data module.

5. The wagering system according to claim 1, wherein the central data processor is operable to limit available wagers for sale, downloaded to the agent data modules, in order to limit potential liability of operators of the lottery system to particular player entries.

6. The wagering system according to claim 1, wherein the central data processor is operable to report invoicing information to agents by downloading said invoicing information onto the agent data modules, the agent terminals including means for reading out said invoicing information.

7. The wagering system according to claim 6, wherein said invoicing information is applied by the central data processor to reflect a credit for payout of at least one win.

8. The wagering system according to claim wherein the central data processor is operable to download general information of interest to the agents apart from said available entries and verifications.

9. The wagering system according to claim 1, wherein said security means comprises at least one of encryption and decryption means, security access code detection means, unauthorized access detection means, and automatic blocking of the available player entries.

10. The wagering system according to claim 9, wherein said security means is operable during data communication with the agent data terminals.

11. The wagering system according to claim 10, wherein said security means is self contained in the agent data modules and operable during any data communication with the agent data modules.

12. The wagering system according to claim 1, wherein the agent data modules comprise smartcards, each having on-board processor operable to manage data communication with the agent data modules and storage of data thereon.

13. The wagering system according to claim 12, wherein the agent data modules are powered substantially via power supply means external to the agent data modules during communication with at least one of the central data processor and the agent data terminals, the agent data modules comprising at least one of a non-volatile programmable data memory, and a volatile data memory with battery means for maintaining contents of the volatile data memory.

14. The wagering system according to claim 12, further comprising at least one transfer data terminal in data communication with the central data processor, the transfer data terminal being operable to interface between the agent data modules and the central data processor during communications between the central data processor and the agent data modules.

15. A method for conducting a wagering system in which player wagers are accepted at points of sale remote from a central data processor and managed by the central data processor, comprising the steps of:

providing a central data processor having a central dam memory;

receiving player entry data from players at agent terminals remote from the central processor;

issuing agent data modules to agents, the agent modules being self contained and transportable, and being coupleable in data communication with at least one of the agent terminals, the agent data modules having an on-board memory including at least one of: magnetic media, integrated circuit memory and laser optical memory, said agent data modules also being coupleable in data communication with the central data processor;

coupling the agent data modules to the central data processor and downloading data to the agent data modules from the central data processor, and storing the data on the agent data modules, the data representing a series of available player entries and verifications of the available player entries, for assignment to players;

decoupling the agent data modules from the central processor and coupling the agent data modules to the agent data terminals, and operating the agent data modules in conjunction with the agent data terminals to record assignment of said available player entries to said players;

wherein the central processor and the agent data terminals are operable to conduct bidirectional communications for managing at least one of acceptance of player entries, verification of player entries, and payout authorization for player entries, using the agent data modules for transporting data in both directions between the central data processor and the agent data terminals; and during data communication with the agent data modules, detecting unauthorized access, and blocking operation of the agent data modules upon detection of unauthorized access, using security means self contained and independently operable in the data modules.

16. The method for conducting a wagering system according to claim 15, further comprising unloading to the central data processor a record of assignments of the available player entries to the players, by loading the record of assignments to the agent data modules, decoupling the agent data modules from the agent data terminals, coupling the agent data modules to the central data processor, and transferring the record of assignments to the central data processor.

17. The method for conducting a wagering system according to claim 16, comprising processing via the central data processor, uploaded player entries from the available player entries as assigned to players, as entries in a pool of player entries, and selecting at least one winner.

18. The method for conducting a wagering system according to claim 17, further comprising downloading to each of the agent data modules data representing a winning player entry previously uploaded from said agent data module, and operating the agent data terminals to process a payout on the winning player entry.

19. The method for conducting a wagering system according to claim 15, further comprising security steps associated with data communication with the agent data modules, the security steps including at least one of encrypting and decrypting data, detecting a security access code, detecting an unauthorized access, and automatically blocking the available player entries, operation of the agent data modules being stopped independently by the agent data modules upon detection of a breach of security.

20. The method for conducting a wagering system according to claim 19, wherein said security steps are conducted in conjunction with all data communication with the agent data terminals.

21. The method for conducting a wagering system according to claim 15, comprising using smartcards as the agent data modules, the smartcards having on-board processor operable to manage data communication with the agent data modules and storage of data thereon.

22. The method for conducting a wagering system according to claim 21, comprising powering the agent data modules substantially via power supply means external to the agent data modules during communication with at least one of the central data processor and the agent data terminals, the agent data modules comprising at least one of a non-volatile programmable data memory, and a volatile data memory with battery means for maintaining contents of the volatile data memory.

23. The method for conducting a wagering system according to claim 15, wherein at least one of said uploading and downloading steps includes data transmission via at least one transfer data terminal in data communication with the central data processor, the transfer data terminal interfacing between the agent data modules and the central data processor during communications between the central data processor and the agent data modules.

24. The method for conducting a wagering system according to claim 15, comprising downloading from the central processor to the agent data modules authentication information on specific player entries and comparing player entries presented as winning entries to the authentication information on the agent data modules.

25. The method for conducting a wagering system according to claim 15, further comprising downloading from the central processor to the agent data modules data defining limits on a maximum number of occurrences of at least one particular player entry to be issued, and managing issue of player entries to remain within said limits.

26. The method for conducting a wagering system according to claim 15, further comprising downloading from the central processor to the agent data modules at least one of information of interest to lottery agents generally and information of interest to a particular lottery agent to whom a respective agent data module is issued.

27. The method for conducting a wagering system according to claim 26, wherein said information of interest to a particular lottery agent includes invoicing information.

* * * * *

UNITED STATES PATENT AND TRADEMARK OFFICE
CERTIFICATE OF CORRECTION

PATENT NO. : 5,276,312
DATED : January 4, 1994
INVENTOR(S) : R. Steven McCarthy

It is certified that error appears in the above-indentified patent and that said Letters Patent is hereby corrected as shown below:

Column 4, line 54, change "wagers" to read --wagers.--.

Column 6, line 37, change "Fig. 1" to read --Fig. 1.--.

Column 12, line 50, change "terminal" to read --terminal.--.

Column 13, line 1, change "openable" to read --operable--.

In the Claims

Column 14, line 3, insert --1-- after "claim".

Column 14, line 46, change "dam" to read --data--.

Signed and Sealed this

Fourteenth Day of June, 1994

*Attest:*

BRUCE LEHMAN

*Attesting Officer*     *Commissioner of Patents and Trademarks*